United States Patent
Takano

(10) Patent No.: US 9,413,438 B2
(45) Date of Patent: Aug. 9, 2016

(54) WIRELESS COMMUNICATION DEVICE AND WIRELESS COMMUNICATION METHOD

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 212 days.

(21) Appl. No.: 13/203,814

(22) PCT Filed: Jan. 18, 2010

(86) PCT No.: PCT/JP2010/050494
§ 371 (c)(1),
(2), (4) Date: Aug. 29, 2011

(87) PCT Pub. No.: WO2010/100963
PCT Pub. Date: Sep. 10, 2010

(65) Prior Publication Data
US 2011/0317599 A1    Dec. 29, 2011

(30) Foreign Application Priority Data

Mar. 5, 2009  (JP) ................. P2009-052675

(51) Int. Cl.
*H04B 7/00* (2006.01)
*H04B 7/04* (2006.01)
(Continued)

(52) U.S. Cl.
CPC ............ *H04B 7/0413* (2013.01); *H04L 1/1854* (2013.01); *H04L 1/1887* (2013.01);
(Continued)

(58) Field of Classification Search
CPC ............. H04B 7/18582; H04B 7/0413; H04B 1/7176; H04B 7/0695; H01L 27/0008; H01L 27/2601; H01L 27/2602; H01L 25/0204; H01L 1/0079; H01L 25/022; H01L 27/0012; H01L 2025/03426; H01L 27/2649; H04W 84/12; H04W 28/06; H04W 28/04
USPC ........................................................ 370/310
See application file for complete search history.

(56) References Cited

U.S. PATENT DOCUMENTS

2003/0118031 A1*  6/2003  Classon et al. ........... 370/395.54
2004/0082294 A1    4/2004  Ekl et al.
(Continued)

FOREIGN PATENT DOCUMENTS

JP    2008-526136    7/2006
JP    2008-118692    5/2008
(Continued)

OTHER PUBLICATIONS

Japanese Office Action document for Japanese application No. 2009-052675, dated Oct. 23, 2012.
(Continued)

*Primary Examiner* — Melanie Jagannathan
*Assistant Examiner* — Najeebuddin Ansari
(74) *Attorney, Agent, or Firm* — Paratus Law Group, PLLC

(57) ABSTRACT

Provided is a wireless communication device and a wireless communication method which can maintain compatibility with a plurality of communication schemes and send a response signal back within the allowed time specified by each communication scheme. The wireless communication device includes a radio receiving unit (120) that receives a packet having a format conforming to a first communication scheme and including a second format portion conforming to a second communication scheme using a higher frequency band than the first communication scheme and a first format portion excluding the second format portion, and a processing unit (160) that, outputs a response signal at completion of demodulation and decoding of the first format portion, regardless of whether demodulation and decoding of the second format portion are completed or not.

6 Claims, 14 Drawing Sheets

(51) Int. Cl.
  *H04L 27/26* (2006.01)
  *H04W 4/18* (2009.01)
  *H04L 1/18* (2006.01)
  *H04L 27/34* (2006.01)
  *H04W 88/06* (2009.01)
  *H04L 27/00* (2006.01)

(52) U.S. Cl.
  CPC ........ *H04L27/2602* (2013.01); *H04L 27/2647* (2013.01); *H04L 27/3472* (2013.01); *H04W 4/18* (2013.01); *H04L 27/0012* (2013.01); *H04L 27/2657* (2013.01); *H04W 88/06* (2013.01)

(56) References Cited

U.S. PATENT DOCUMENTS

| | | | |
|---|---|---|---|
| 2005/0153735 A1 | 7/2005 | Morioka et al. | |
| 2007/0030799 A1* | 2/2007 | Kaburaki et al. | 370/216 |
| 2007/0224953 A1* | 9/2007 | Nakagawa et al. | 455/140 |
| 2007/0232344 A1 | 10/2007 | Aoki et al. | |
| 2008/0063089 A1* | 3/2008 | Chen | 375/240.26 |
| 2009/0141829 A1* | 6/2009 | Feher | 375/302 |
| 2009/0245195 A1* | 10/2009 | Bhattad et al. | 370/329 |
| 2009/0274139 A1* | 11/2009 | Palanki | 370/349 |
| 2009/0323563 A1* | 12/2009 | Ho et al. | 370/280 |
| 2010/0014502 A1* | 1/2010 | Singh et al. | 370/343 |
| 2010/0054223 A1* | 3/2010 | Zhang et al. | 370/338 |

FOREIGN PATENT DOCUMENTS

| | | |
|---|---|---|
| JP | 2008-526135 | 7/2008 |
| JP | 2008-278205 | 11/2008 |

OTHER PUBLICATIONS

Mar. 3, 2013, JPO Communication in related application No. JP 2009-052675.
International Search Report from Japanese Patent Office for PCT/JP2010/050494, dated Apr. 13, 2010.
Aug. 2, 2013, Chinese Communication in related application No. CN 201080009799.0.
Oct. 15, 2014, EP communication issued for related EP application No. 10748561.7.
Aon Mujtaba, et al., Agere Systems, TGn Sync Proposal, Aug. 13, 2004, pp. 1-56.
Syed Aon Mujtaba, et al., Agere Systems, TGn Sync Proposal Technical Specification, Jul. 8, 2005, pp. 1-133.
Dec. 14, 2015, EP communication issued for related EP application No. 15183313.4.
Richard Van Nee, et al., The 802.11n MIMO-OFDM Standard for Wireless LAN and Beyond, Airgo Networks, Wireless Personal Communications (2006) 37: 445-453, pp. 1-9.

* cited by examiner

WIRELESS COMMUNICATION DEVICE AND WIRELESS COMMUNICATION METHOD

TECHNICAL FIELD

The present invention relates to a wireless communication device and a wireless communication method.

BACKGROUND ART

In recent years, various techniques related to speeding up of wireless communication have been developed. For example, IEEE 802.11n (hereinafter referred to as 11n), which is one of standard specifications for wireless communication, employs the MIMO (Multiple Input Multiple Output) scheme in which a transmitter and a receiver each have a plurality of antennas and perform communication assuming transmission paths between the antennas as virtual communication channels independent of each other, thereby achieving significant improvement of throughput compared to a communication scheme such as the existing IEEE 802.11a (hereinafter referred to as 11a).

In this manner, the improvement of throughput has been achieved to a certain extent in 11n. However, a further speeding up is required to handle the increasing amount of information of contents.

In studies of a new communication scheme, it is important to consider compatibility with another communication scheme. For example, it is preferred that 11n has backward compatibility with the existing communication standards such as 11a. Therefore, wireless communication devices capable of receiving 11n packets are often designed to be capable of receiving both packets of 11a packets and 11n packets.

Further, when a wireless communication device on the receiving side finishes receiving a data packet, it transmits ACK, which is a response signal, to a wireless communication device on the transmitting side in order to notify that the packet has been successfully received. In 11a and 11n, for example, the allowed time from the end of reception of the data packet to the start of transmission of the ACK is specified to be 16 µs as SIFS (Short Inter Frame Space).

CITATION LIST

Patent Literature

Patent Literature 1: JP 2008-118692A

SUMMARY OF INVENTION

Technical Problem

One means to accomplish higher throughput than the existing communication schemes is to increase the number of antennas of a wireless communication device. However, the increase in the number of antennas causes an increase in the computational complexity for processing a plurality of stream channels, e.g., the computational complexity for performing space division of stream channels.

The computational complexity for performing space division of stream channels increases exponentially with the increase in the number of antennas. Therefore, the increase in the number of antennas of a wireless communication device causes a problem that the computation for processing like space division, for example, is not completed within the time specified as SIFS. In such a case, the wireless communication device with the increased number of antennas has a problem that it fails to maintain compatibility with the communication schemes specifying SIFS, such as 11a and 11n.

The present invention has been accomplished in light of the foregoing, and an object of the present invention is to provide a novel and improved wireless communication device and wireless communication method which can maintain compatibility with a plurality of communication schemes and send a response signal back within the allowed time specified by each communication scheme.

Solution to Problem

To solve the above problem, according to one aspect of the present invention, there is provided a wireless communication device including a radio receiving unit that receives a packet having a format conforming to a first communication scheme, the format including a second format portion conforming to a second communication scheme using a higher frequency band than the first communication scheme and a first format portion excluding the second format portion, and a processing unit that outputs a response signal at completion of demodulation and decoding of the first format portion in the packet, regardless of whether demodulation and decoding of the second format portion are completed or not.

The wireless communication device may further include a determination unit that determines whether the format of the packet contains the second format portion or not.

The determination unit may determine whether the format of the packet contains the second format portion or not based on signal arrangement of a header of the first format portion.

The determination unit may determine whether the format of the packet contains the second format portion or not based on signal arrangement of a position corresponding to a header of the second format portion in the packet.

The wireless communication device may further include a memory unit that temporarily stores the second format portion of the packet.

The wireless communication device may further include an arithmetic unit that processes the second format portion stored in the memory unit by software using an arithmetic logic device.

The packet may be a packet where the first format portion and the second format portion are encoded individually of each other.

The radio receiving unit may include a frequency offset compensation unit that compensates a frequency offset of the second format portion by using the first format portion.

A larger number of subcarriers may be multiplexed in the second format portion than in the first format portion.

The second format portion may be time-interleaved using a longer time interleaving length than the first format portion.

The second format portion may be encoded by Reed-Solomon coding.

Further, to solve the above problem, according to another aspect of the present invention, there is provided a wireless communication method including a step of receiving a packet having a format conforming to a first communication scheme, the format including a second format portion conforming to a second communication scheme using a higher frequency band than the first communication scheme and a first format portion excluding the second format portion, a step of demodulating and decoding the first format portion, and a step of outputting a response signal at completion of demodulation and decoding of the first format portion, regardless of whether demodulation and decoding of the second format portion are completed or not.

Advantageous Effects of Invention

As described above, according to the present invention, it is possible to provide a wireless communication device and a wireless communication method which can maintain compatibility with a plurality of communication schemes and send a response signal back within the allowed time specified by each communication scheme.

REFERENCE SIGNS LIST

Figure 1:
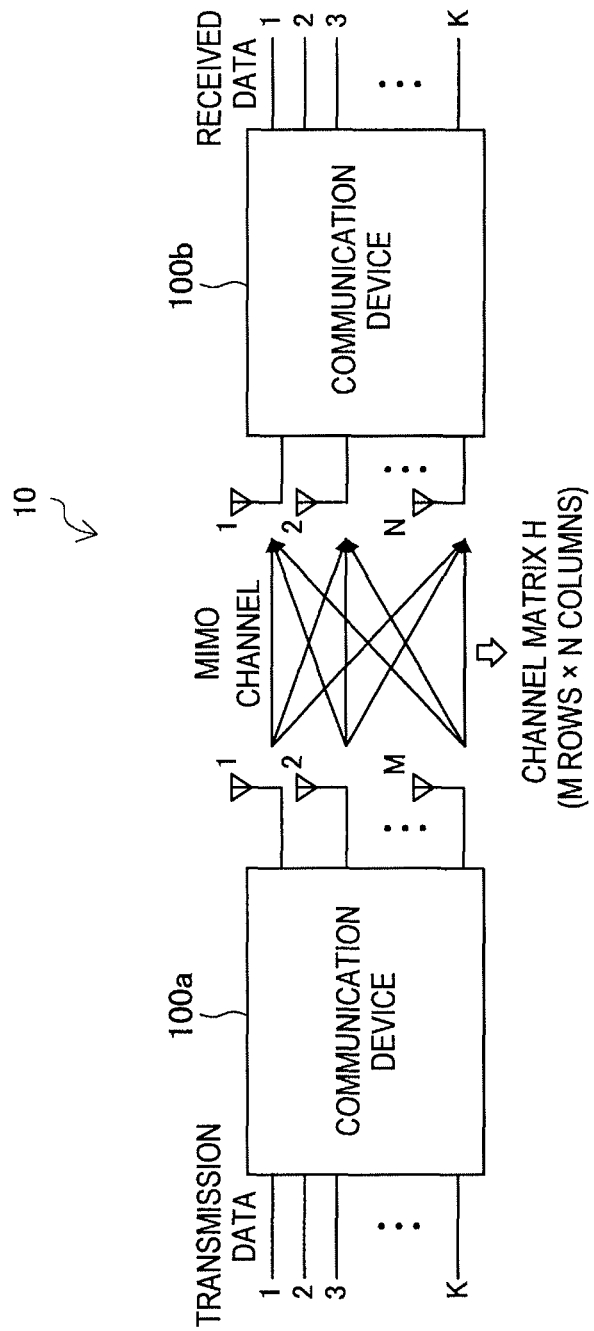
FIG. 1 is a schematic diagram showing a typical MIMO wireless communication system.

100 Wireless communication device
110 Antenna unit
120 Radio receiving unit
130, 230 Determination control unit
132, 232 Determination unit
134, 234 Memory unit
239 Arithmetic unit
140 Channel equalization unit
150 Demodulation and decoding unit
160 Processing unit
170 Encoding and modulation unit
180 Radio transmitting unit Description Of Embodiments Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that, "Description of Embodiments" will be provided hereinafter in the following order.

1. Overview of Wireless Communication Device
   1-1. Background
   1-2. Packet Transmission/Reception Sequence According to One Embodiment of the Present Invention
2. Packet Format
3. Functional Configuration of Wireless Communication Device
   3-1. Overall Configuration of Wireless Communication Device
   3-2. Configuration of Antenna Unit
   3-3. Configuration of Radio Receiving Unit
   3-4. Configuration of Determination Control Unit
   3-5. Configuration of Channel Equalization Unit
   3-6. Configuration of Demodulation and Decoding Unit
   3-7. Configuration of Processing Unit
   3-8. Configuration of Encoding and Modulation Unit
   3-9. Configuration of Radio Transmitting Unit
4. Determination Method of Packet Format
5. Alternative Examples
   5-1. Alternative Example 1 (Alternative Example of Subcarrier Interval)
   5-2. Alternative Example 2 (Alternative Example of Determination Control Unit)

<1. Overview Of Wireless Communication Device>

[1-1. Background]

First, a typical wireless communication system 10 using MIMO technology is described with reference to FIGS. 1 and 15. FIG. 1 is a schematic diagram showing a typical MIMO wireless communication system.

The wireless communication system 10 includes a wireless communication device 100a and a wireless communication device 100b. The wireless communication device 100a has M number of transmitting antennas. Further, the wireless communication device 100b has N number of receiving antennas.

The wireless communication device 100a distributes radio signals generated by spatially encoding k number of data to the M number of transmitting antennas and sends them out to the respective MIMO channel. On the other hand, the wireless communication device 100b receives the radio signals transmitted from the wireless communication device 100a by the N number of receiving antennas through the MIMO channels, spatially encodes them and thereby obtains k number of received data.

Thus, the characteristics of the communication channels in MIMO communication are represented by a channel matrix H with M rows and N columns having the channel characteristics corresponding to each pair of the M number of transmitting antennas of the wireless communication device 100a on the transmitting side and the N number of receiving antennas of the wireless communication device 100b on the receiving side as elements.

The wireless communication device 100b estimates the channel matrix H by using known signals such as preamble signals or pilot signals, for example. Then, the wireless communication device 100b performs space division of the received radio signals by using the estimated channel matrix H. In this manner, the space division processing of stream channels includes matrix computation. Therefore, the computational complexity for the space division of stream channels increases exponentially according to the number of antennas.

Next, a typical example of a transmission/reception sequence of packets is described with reference to FIG. 15. FIG. 15 is an explanatory diagram illustrating a transmission/reception sequence of packets conforming to the existing communication scheme. In the communication schemes such as 11a and 11n, for example, the RTS/CTS (Request To Send/Clear To Send) scheme is adopted as a measure against hidden terminals.

In the RTS/CTS scheme, a wireless communication device on the transmitting side (hereinafter referred to as the transmitting device), which is a transmission source of data packets, first transmits RTS. As a response to the RTS, a wireless communication device on the receiving side (hereinafter referred to as the receiving device) which has received the RTS transmits CTS notifying that preparation for reception is completed to the transmitting device. Then, after receiving the CTS, the transmitting device transmits a data packet to the receiving device.

Further, at the completion of receiving the data packet, the receiving device transmits ACK, which is a response signal, to the transmitting device in order to notify that the packet has been successfully received. The allowed time from the end of reception of the data packet to the start of transmission of the ACK is generally specified by each communication scheme. In 11a and 11n, for example, the allowed time is specified to be 16 µs as SIFS.

11n is the communication scheme which is specified assuming the use of antennas up to 4×4. Thus, when the number of antennas is 4×4 or more in order to accomplish higher throughput for 11n, the receiving device fails to send the response signal back within the allowed time specified by a given communication scheme in some cases due to an increase in the computational complexity described above. In the case where the receiving device fails to send the response signal back within the time specified by a given communication scheme, the wireless communication device fails to maintain compatibility with the communication scheme.

In view of the above, as one means to maintain compatibility with each communication scheme, it is considered to enhance the computational speed of space division processing or the like to finish computation and send the response signal back within the allowed time. For example, in order to enhance the computational speed, a dedicated processing circuit may be incorporated into the wireless communication device. In this case, however, the hardware size of the wireless communication device increases.

On the other hand, in order to prevent the increase in hardware size and maintain compatibility with each communication scheme, a wireless communication device and a wireless communication method according to one embodiment of the present invention send the response signal back within the time specified by the communication scheme and further allow a sufficient processing time for the computation of space division or the like. Hereinafter, a specific means to realize the wireless communication device and the wireless communication method is described.

[1-2. Packet Transmission/Reception Sequence According to One Embodiment of the Present Invention]

Figure 2:
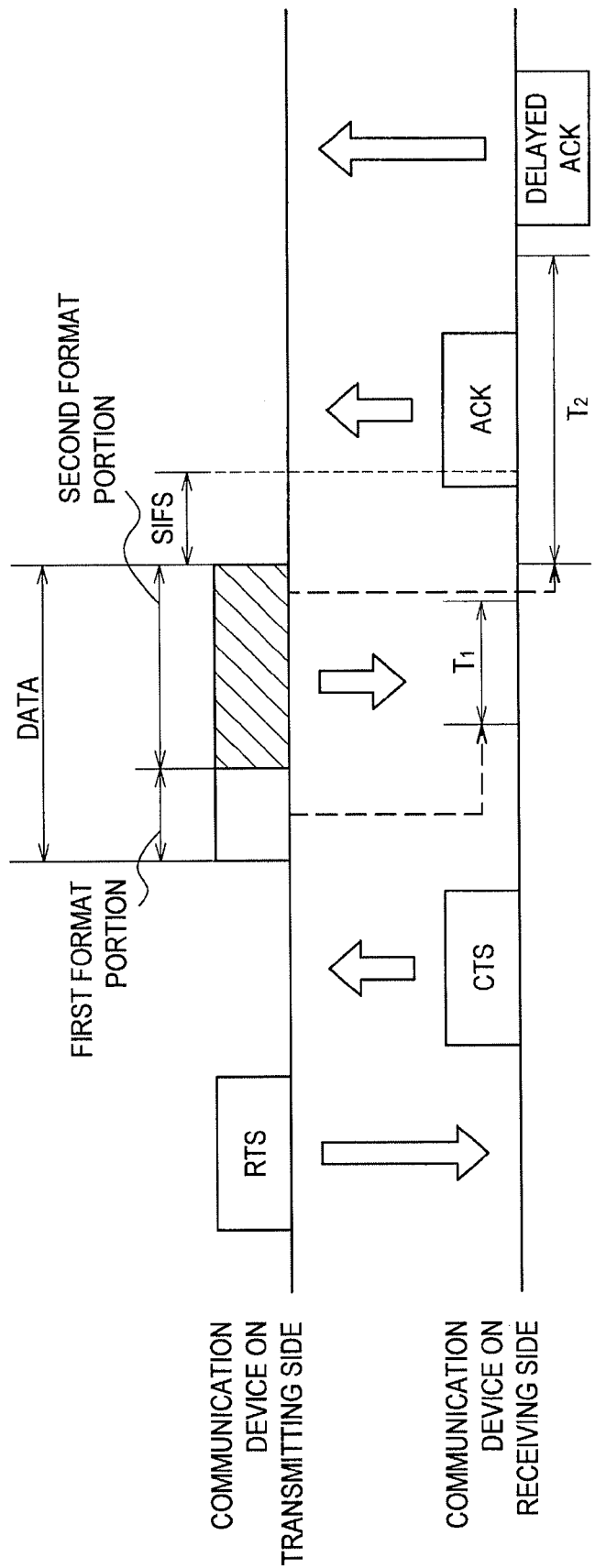
FIG. 2 is an explanatory diagram illustrating a packet transmission/reception sequence in a wireless communication system according to one embodiment.

First, a transmission/reception sequence of packets according to one embodiment of the present invention is descried with reference to FIG. 2. FIG. 2 is an explanatory diagram illustrating a packet transmission/reception sequence according to one embodiment of the present invention.

Figure 15:
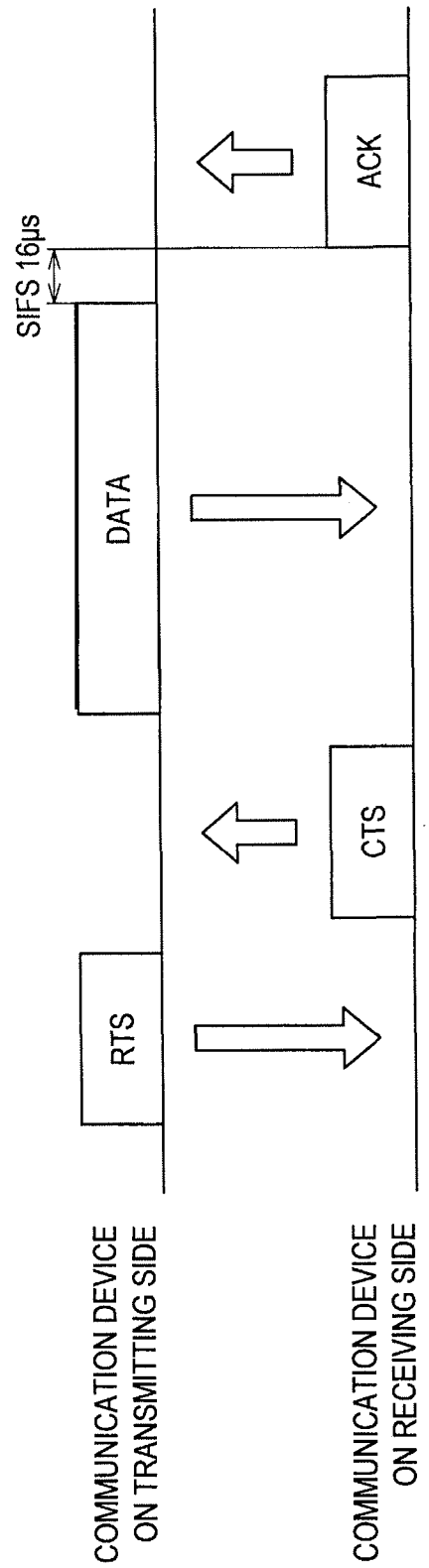
FIG. 15 is an explanatory diagram illustrating the existing packet transmission/reception sequence.

In the transmission/reception sequence of packets according to one embodiment of the present invention, the RTS/CTS scheme which is described in the typical example shown in FIG. 15 is adopted.

Note that a data packet that is transmitted and received in this embodiment is a packet having a format conforming to the first communication scheme and including a second format portion (the shaded area in the figure) conforming to the second communication scheme which uses a higher frequency band than the first communication scheme and a first format portion excluding the second format portion. The first communication scheme and the second communication scheme are communication schemes used for wireless communication. The first communication scheme may be 11a and 11n, for example. On the other hand, the second communication scheme may be VHT (Very High Throughput), for example. VHT is a wireless communication scheme succeeding to 11n, and it is a wireless communication scheme that uses a higher frequency band than 11n.

In FIG. 2, a communication device on the receiving side, which is a receiving device, receives a data packet and starts demodulation and decoding of the first format portion first. The demodulation and decoding of the first format portion are completed within a period $T_1$ shown in FIG. 2, for example. Then, at the completion of the demodulation and decoding of the first format portion, the receiving device transmits ACK, which is a response signal, regardless of whether the demodulation and decoding of the second format portion are completed or not. The receiving device can thereby send ACK back within the allowed time of SIFS or the like which is specified by the first communication scheme.

Further, after the completion of the demodulation and decoding of the first format portion, the receiving device performs demodulation and decoding of the second format portion within a period $T_2$ shown in FIG. 2, for example. Therefore, a sufficient processing time for the demodulation and decoding of the second format portion is allowed. Note that, after the completion of the demodulation and decoding of the second format portion, the receiving device may further transmit a response signal for the second format portion by using a technique such as delayed ACK.

<2. Packet Format>

Figure 3:
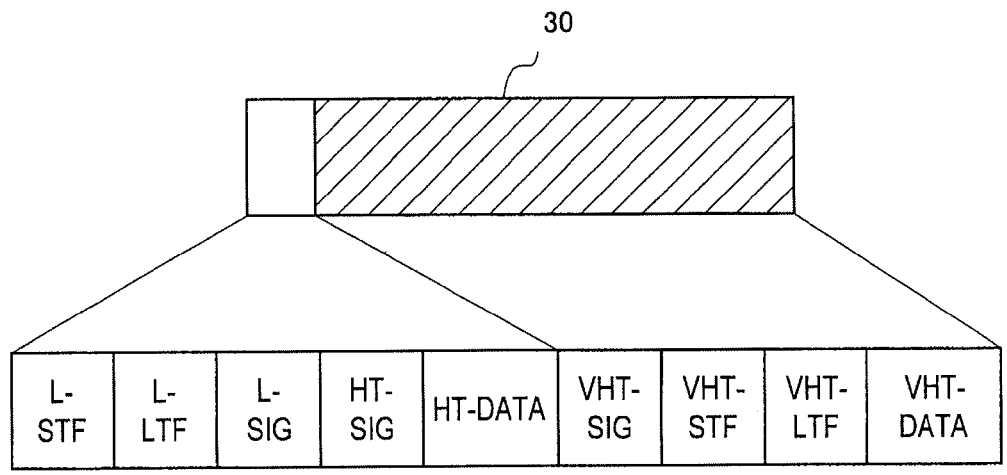
FIG. 3 is an explanatory diagram showing an example of a packet format.
Figure 4:
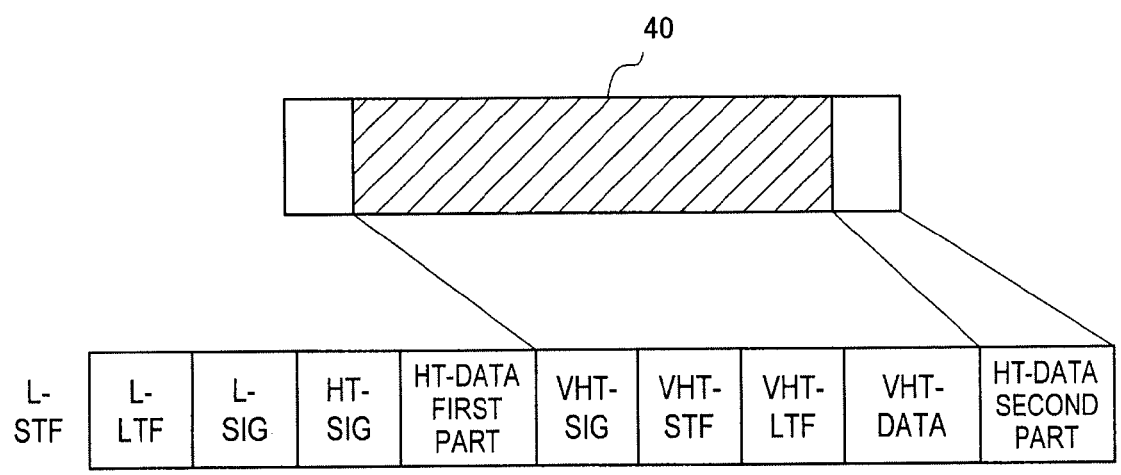
FIG. 4 is an explanatory diagram showing another example of a packet format.
Figure 5:
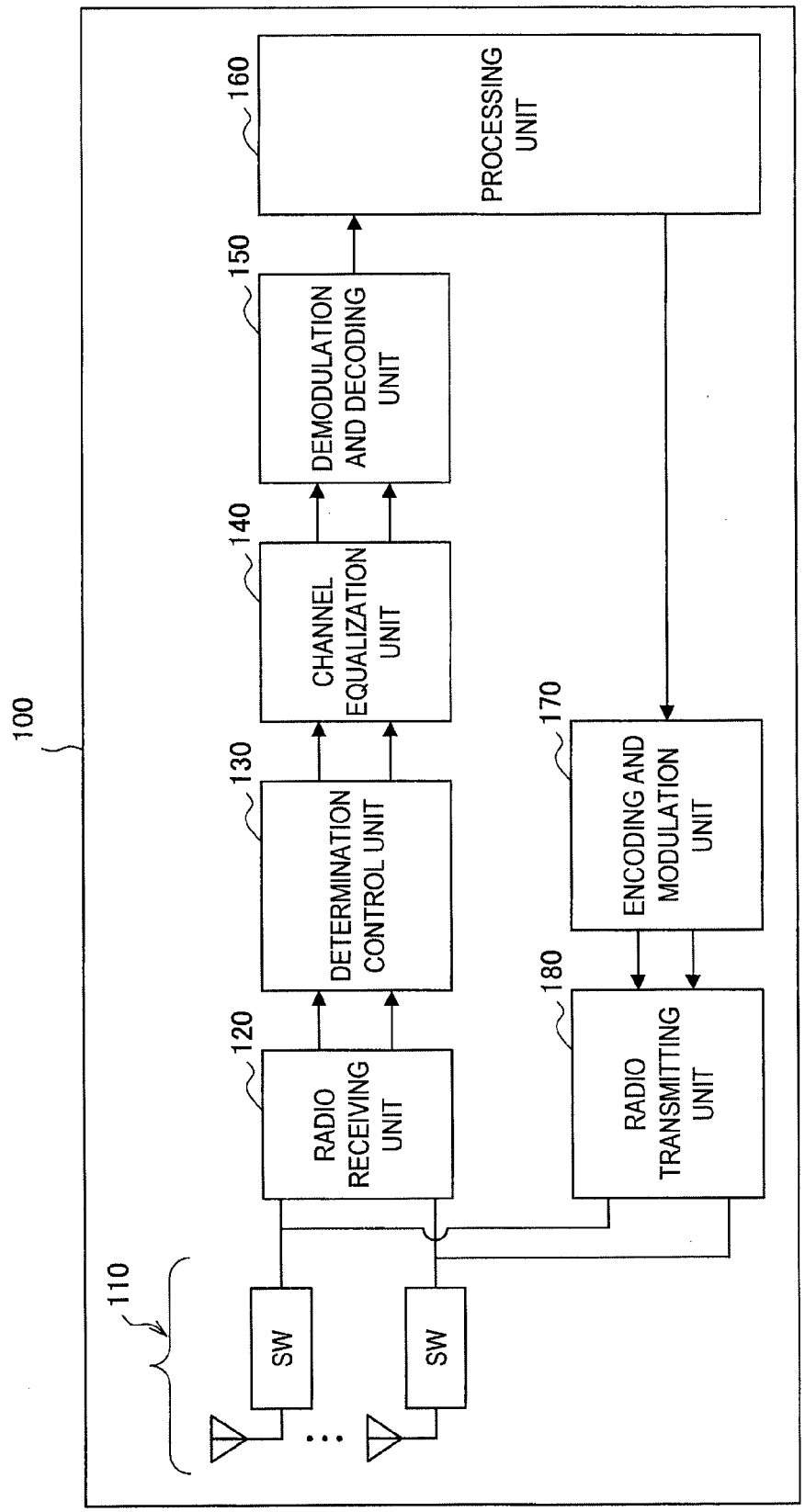
FIG. 5 is a block diagram showing a configuration of a wireless communication device according to one embodiment.

Next, the format of the above-described data packet is described with reference to FIGS. 3 and 4. FIG. 3 is an explanatory diagram showing an example of a packet format. FIG. 4 is an explanatory diagram showing another example of a packet format.

Hereinafter, a case where the first communication scheme is 11n and the second communication scheme is VHT is described in this embodiment. When the first communication scheme is 11n, the first format portion is referred to as the 11n format portion. Further, when the second communication scheme is VHT, the second format portion is referred to as the VHT format portion.

A data packet 30 shown in FIG. 3 is an example in which the VHT format portion (the shaded area in the figure) is embedded in the latter part of a data portion of a packet having the 11n format. The 11n format portion (a part other than the shaded area in the figure) contains L-STF, L-LTF, L-SIG, HT-SIG and HT-DATA. On the other hand, the VHT format portion contains VHT-SIG, VHT-STF, VHT-LTF and VHT-DATA.

The receiving device performs communication by the first communication scheme such as 11a or 11n until the reception of the VHT format. Thus, the antenna configuration is changed at the time of receiving the VHT format portion. Therefore, it is necessary to perform processing such as AGC (Automatic Gain Control) and channel matrix acquisition again. For that reason, the VHT format portion contains preambles such as VHT-SIG, VHT-STF and VHT-LTF in order to perform AGC and channel matrix acquisition at the time of receiving the VHT format portion.

A data packet 40 shown in FIG. 4 is an example in which the VHT format portion is embedded in the middle part of a data portion of a packet having the 11n format. The 11n format portion contains L-STF, L-LTF, L-SIG, HT-SIG, the first part of HT-DATA and the latter part of HT-DATA. On the other hand, the VHT format portion contains VHT-SIG, VHT-STF, VHT-LTF and VHT-DATA.

In the data packet 30, the end part of the data packet is contained in the VHT format. Therefore, the wireless communication device that transmits and receives the data packet 30 needs to additionally insert processing for determining the end of the data packet. On the other hand, in the data packet 40, the end part of the data packet is contained in the 11n format. Therefore, the use of the data packet 40 has an advantage that there is no need to additionally insert processing for determining the end of the data packet.

Further, on the other hand, in the data packet 40, the 11n format portion is separated at front and back. Therefore, the wireless communication device that transmits the data packet 40 performs processing such as frequency interleaving, convolution coding and scrambling, for example, by skipping the VHT format portion. However, the wireless communication device that transmits and receives the data packet 30 does not have such a need, thus being advantageous in terms of device.

Although the data packets shown in FIGS. 3 and 4 are packets in which the VHT format portion is embedded in the packet of the 11n format, it is not limited thereto. For example, the data packet may be a packet having the format conforming to another communication scheme such as 11a.

Further, although not shown, the data packet may have a structure in which the VHT format is embedded in the first part of the data portion. In addition, the entire part of the data portion of the data packet may be the VHT format.

<3. Functional Configuration Of Wireless Communication Device>

[3-1. Overall Configuration of Wireless Communication Device]

Next, a functional configuration of the wireless communication device 100 according to one embodiment of the present invention is described with reference to FIGS. 5 to 10. The overall configuration of the wireless communication device 100 is described first with reference to FIG. 5, and the detail of each part is described after that.

In the following, when not particularly stated, the case of processing the data packet shown in FIG. 3 is described by way of illustration.

The wireless communication device 100 according to one embodiment of the present invention mainly includes an antenna unit 110, a radio receiving unit 120, a determination control unit 130, a channel equalization unit 140, a demodulation and decoding unit 150, a processing unit 160, an encoding and modulation unit 170, and a radio transmitting unit 180.

[3-2. Configuration of Antenna Unit]

The antenna unit 110 receives a radio signal from another wireless communication device, for example, and outputs the received signal to the radio receiving unit 120. Further, the antenna unit 110 transmits a transmission signal which is input from the radio transmitting unit 180 to another wireless communication device.

The antenna unit 110 includes a plurality of antennas and a plurality of switches (SWs) corresponding to the number of antennas. In this embodiment, the case of including two antennas is described as an example for easier explanation.

[3-3. Configuration of Radio Receiving Unit]

The radio receiving unit 120 converts the received signal which is received by the antenna unit 110 from an analog signal to a digital signal, for example, and outputs it to the determination control unit 130.

Figure 6:
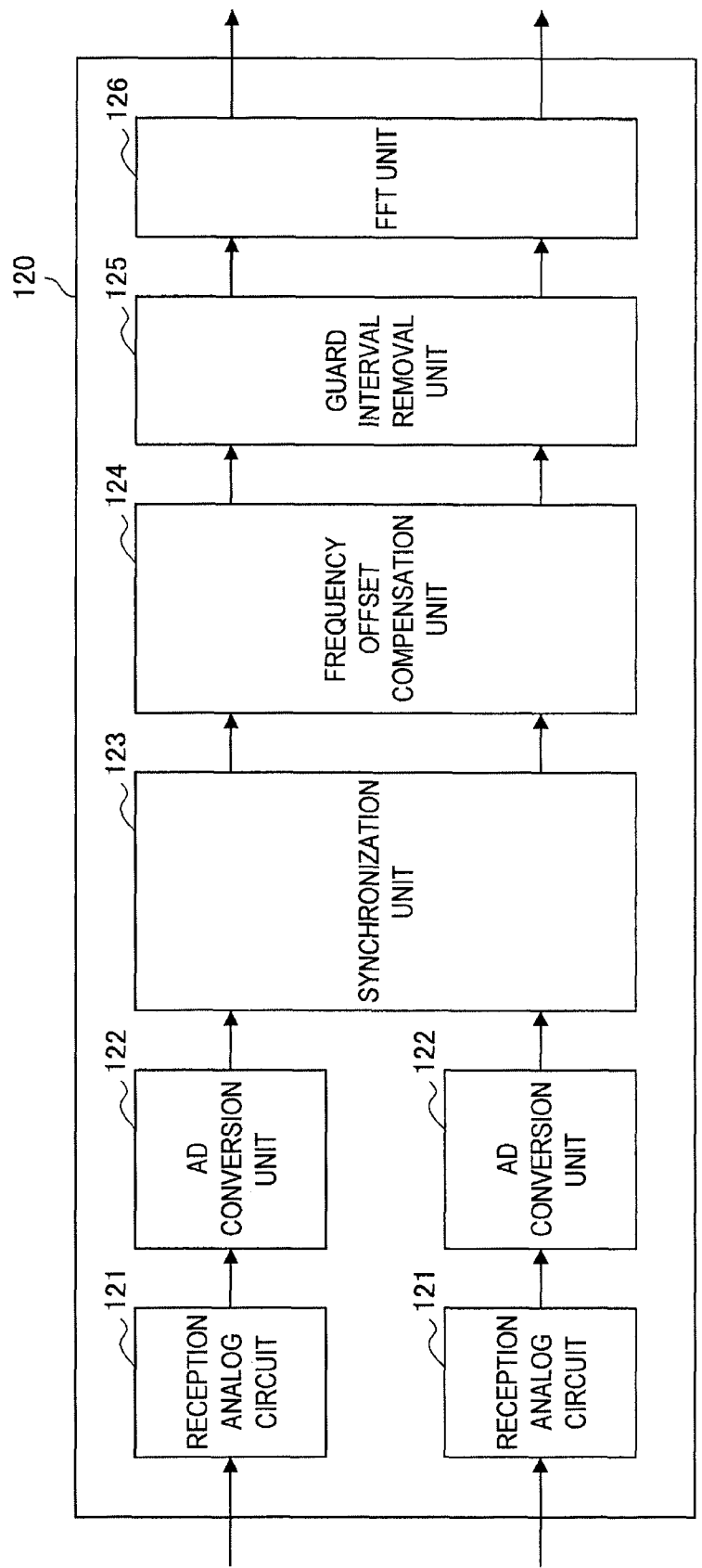
FIG. 6 is a block diagram showing a detail of a radio receiving unit of the wireless communication device in FIG. 5.

A detailed functional configuration of the radio receiving unit 120 is described hereinafter with reference to FIG. 6. FIG. 6 is a block diagram showing a detail of the radio receiving unit 120 of the wireless communication device 100. The radio receiving unit 120 mainly includes a plurality of reception analog circuits 121, a plurality of AD (Analog to Digital) conversion units 122, a synchronization unit 123, a frequency offset compensation unit 124, a guard interval removal unit 125, and a FFT (Fast Fourier Transform) unit 126.

The reception analog circuit 121 performs various signal processing such as signal amplification and frequency conversion on the received signal which is input from the antenna unit 110, and outputs the received signal to the AD conversion unit 122.

The AD conversion unit 122 converts the received signal which is input from the reception analog circuit 121 into a digital signal, and outputs the received signal to the synchronization unit 123.

The synchronization unit 123 recognizes a header of the packet, for example, and detects a synchronous timing from the received signal which is input from the AD conversion unit 122, and outputs the received signal to the frequency offset compensation unit 124.

The frequency offset compensation unit 124 estimates a frequency offset from the received signal which is input from the synchronization unit 123, and corrects the received signal using the estimated frequency offset. The frequency offset compensation unit 124 outputs the corrected received signal to the guard interval removal unit 125.

The guard interval removal unit 125 removes the guard interval which has been added in the transmitting device from the received signal which is input from the frequency offset compensation unit 124, and outputs the received signal after the guard interval removal to the FFT unit 126.

The FFT unit 126 branches the received signal in the time domain which is input from the guard interval removal unit 125 to a subcarrier signal in the frequency domain, and outputs it to the determination control unit 130.

[3-4. Configuration of Determination Control Unit]

The determination control unit 130 determines the type of the packet that is contained in the received signal which is input from the radio receiving unit 120, and makes control to output the received signal to the channel equalization unit 140 in a predetermined order.

Figure 7:
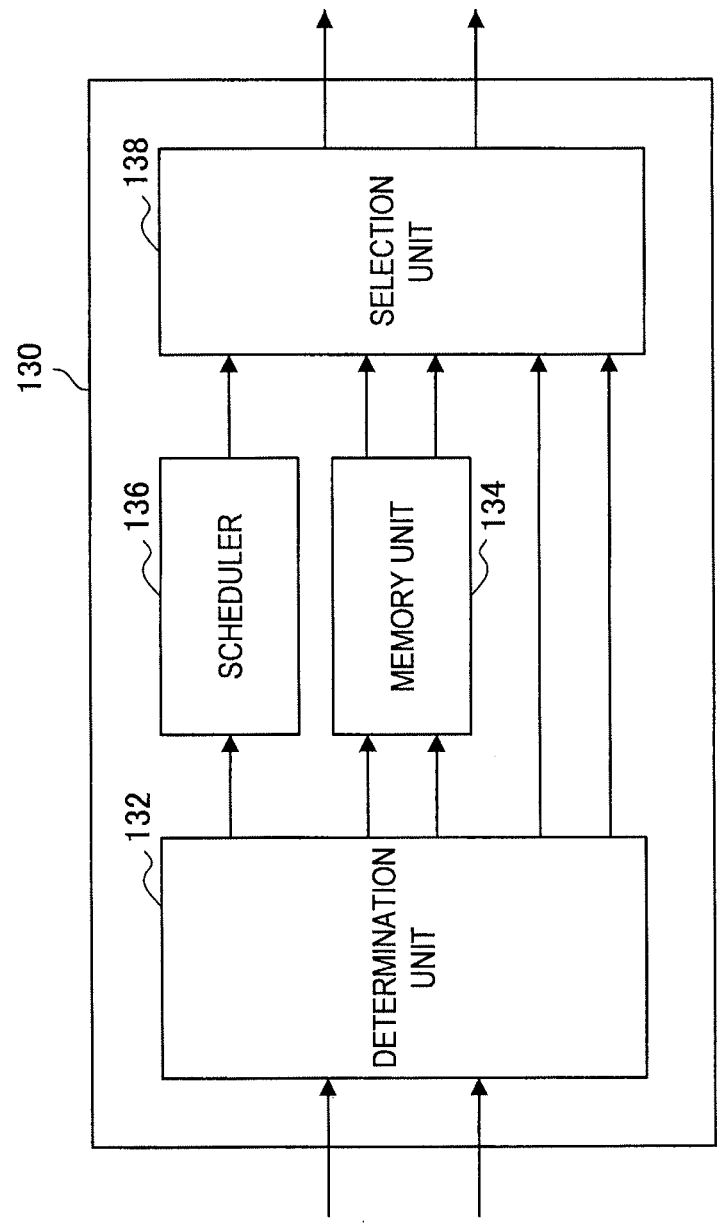
FIG. 7 is a block diagram showing a detail of a determination control unit of the wireless communication device in FIG. 5.

A detailed configuration of the determination control unit 130 is described hereinafter with reference to FIG. 7. FIG. 7 is a block diagram showing a detail of the determination control unit 130 of the wireless communication device 100. The determination control unit 130 mainly includes a determination unit 132, a memory unit 134, a scheduler 136, and a selection unit 138.

The determination unit 132 determines the type of the packet that is contained in the received signal which is input from the radio receiving unit 120. Specifically, the determination unit 132 determines whether the format of the packet contained in the received signal input from the radio receiving unit contains the VHT format portion or not.

When the format of the packet contains the VHT format portion, the determination unit 132 outputs the VHT format portion to the memory unit 134. Further, the determination unit 132 outputs the 11n format portion to the selection unit 138. When the format of the packet does not contain the VHT format portion, the determination unit 132 outputs the packet to the selection unit 138.

For example, the determination unit 132 may determine the type of the received packet based on a difference in the signal arrangement of the header of the 11n format portion. Further, the determination unit 132 may determine the type of the received packet based on a difference in the signal arrangement of the position corresponding to the header of the VHT format portion. In the case where a packet in which L-DATA or HT-DATA does not exist ahead of the header of VHT, and the VHT format portion comes immediately after the header of 11n is used as a packet containing the VHT format, the signal arrangement of the position corresponding to the header of the VHT format portion can be used for the determination of the type of the packet. Further, such determination methods are described in detail later.

The memory unit 134 temporarily stores the VHT format portion which is input from the determination unit 132. The memory unit 134 outputs the VHT format portion of the received signal to the selection unit 138 based on control by the scheduler 136.

The scheduler 136 controls processing timing of the 11n format portion and processing timing of the VHT format portion so as to preferentially process the 11n format portion based on information about the received signal which is input from the determination unit 132. The scheduler 136 may control the processing timing so as to perform processing of the VHT format portion after completing processing of the 11n format portion. Alternatively, the scheduler 136 may control the processing timing so as to perform processing of the VHT format portion with use of idle time of processing of the 11n format portion.

The selection unit 138 outputs the 11n format portion which is input from the determination unit 132 and the VHT format portion which is stored in the memory unit 134 of the received signal according to control by the scheduler 136.

[3-5. Configuration of Channel Equalization Unit]

Referring back to FIG. 5, the channel equalization unit 140 is described. The channel equalization unit 140 estimates a channel matrix H having the channel characteristics corresponding to each pair of the M number of antennas on the transmitting side and the N number of antennas on the receiving side illustrated in FIG. 1 as an example as elements. The channel equalization unit 140 equalizes the received signal by using the channel matrix H, and outputs the equalized received signal to the demodulation and decoding unit 150.

[3-6. Configuration of Demodulation and Decoding Unit]

The demodulation and decoding unit 150 performs demodulation and decoding on the received signal which is input from the channel equalization unit 140, and outputs the received signal to the processing unit 160.

Figure 8:
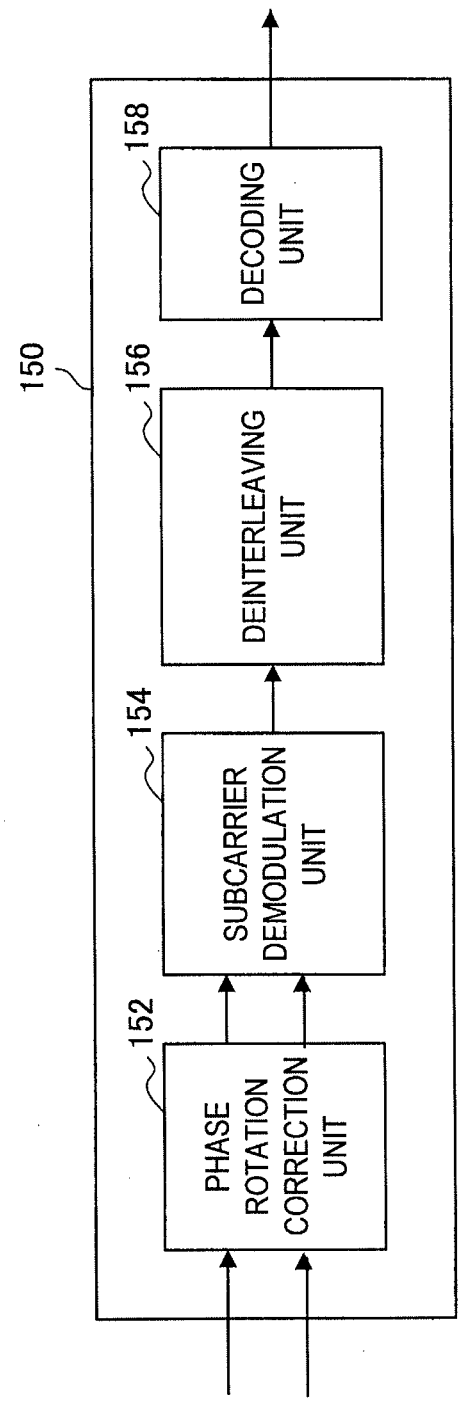
FIG. 8 is a block diagram showing a detail of a demodulation and decoding unit of the wireless communication device in FIG. 5.

A detailed configuration of the demodulation and decoding unit 150 is described hereinafter with reference to FIG. 8. FIG. 8 is a block diagram showing a detail of the demodulation and decoding unit 150 of the wireless communication device 100. The demodulation and decoding unit 150 mainly includes a phase rotation correction unit 152, a subcarrier demodulation unit 154, a deinterleaving unit 156, and a decoding unit 158.

The phase rotation correction unit 152 detects a shift of the phase of the received signal by using a known signal pattern that is contained in the received signal which is input from the channel equalization unit 140, and corrects the detected shift. The phase rotation correction unit 152 outputs the received signal with the phase shift corrected to the subcarrier demodulation unit 154.

The subcarrier demodulation unit 154 demodulates the received signal which is input from the phase rotation correction unit 152 for each subcarrier, and outputs the demodulated received signal to the deinterleaving unit 156.

The deinterleaving unit 156 changes the arrangement of data bits which have been interleaved by interleaving in the transmitting device back to the original on the received signal which is input from the subcarrier demodulation unit 154, and outputs the received signal to the decoding unit 158.

The decoding unit 158 decodes the received signal which is input from the deinterleaving unit 156 according to the scheme of coding which has been performed in the transmitting device, and outputs the received signal to the processing unit 160.

[3-7. Configuration of Processing Unit]

Referring back to FIG. 5, the processing unit 160 is described. The processing unit 160 has a function of processing the MAC and higher layers on the received signal which is input from the demodulation and decoding unit 150. After completing the demodulation and decoding of the 11n format portion, the processing unit 160 outputs a response signal to the encoding and modulation unit 170 regardless of whether the demodulation and decoding of the VHT format portion are completed or not.

Specifically, when the radio signal is received, the processing unit 160 transmits the response signal within the time which is specified as SIFS by the first communication scheme such as 11a or 11n. Thus, the second communication scheme such as VHT can maintain compatibility with the first communication scheme. Further, the demodulation and decoding unit 150 can allow a sufficient processing time for the demodulation and decoding of the VHT format portion.

Further, at the time of transmitting a radio signal from the wireless communication device 100, the processing unit 160 outputs a transmission signal to the encoding and modulation unit 170.

[3-8. Configuration of Encoding and Modulation Unit]

The encoding and modulation unit 170 performs encoding and modulation on the transmission signal which is input from the processing unit 160, and outputs the transmission signal to the radio transmitting unit 180.

Figure 9:
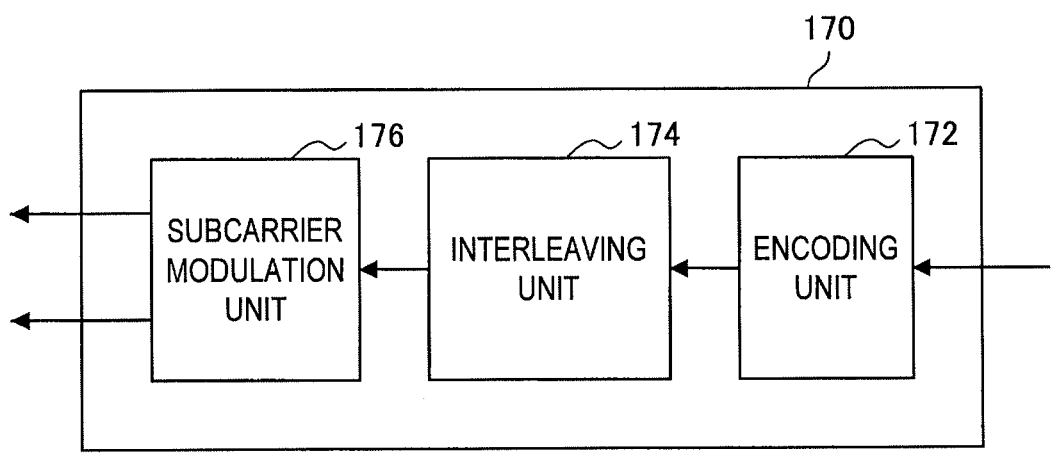
FIG. 9 is a block diagram showing a detail of an encoding and modulation unit of the wireless communication device in FIG. 5.

A detailed configuration of the encoding and modulation unit 170 is described hereinafter with reference to FIG. 9. FIG. 9 is a block diagram showing a detail of the encoding and modulation unit 170 of the wireless communication device 100. The encoding and modulation unit 170 mainly includes an encoding unit 172, an interleaving unit 174, and a subcarrier modulation unit 176.

The encoding unit 172 encodes the transmission signal which is input from the processing unit 160, and outputs the encoded transmission signal to the interleaving unit 174. For example, the encoding unit 172 may perform redundant coding for error correction, such as convolution coding. At this time, the encoding unit 172 separately encodes the 11n format portion and the 11n format portion.

Further, the encoding unit 172 may encode the VHT format portion by Reed-Solomon coding. The encoding by Reed-Solomon coding has high error correction capability. However, because it requires a large amount of processing for decoding, it has not been able to be used in the field where a high processing speed is necessary. In this embodiment, because a sufficient processing time for the encoding of the VHT format portion is allowed, the encoding by Reed-Solomon coding can be used.

The interleaving unit 174 interleaves the data bits of the transmission signal which is input from the encoding unit 172, and outputs it to the subcarrier modulation unit 176. The signal with the data bits interleaved is effective in the case of using codes with low correction capability for the continuous code error such as convolution coding, for example, and the bits are interchanged so that adjacent bits are transmitted by subcarriers which are as distant as possible from each other, for example.

For the VHT format portion, a sufficient processing time for the deinterleaving can be allowed. Therefore, the interleaving unit 174 may perform time interleaving of the VHT format portion by using a longer time interleaving length than the 11n format portion, for example. The error correction accuracy of the VHT format portion which is time-interleaved using a longer time interleaving length than the 11n format portion is higher than the error correction accuracy of the 11n format portion.

The subcarrier modulation unit 176 divides the transmission signal which is input from the interleaving unit 174 into subcarriers and modulates them, and outputs the transmission signal to the radio transmitting unit 180.

[3-9. Configuration of Radio Transmitting Unit]

The radio transmitting unit 180 performs signal processing on the transmission signal which is input from the encoding and modulation unit 170, for example, further converts the transmission signal from a digital signal to an analog signal, and outputs the transmission signal to the antenna unit 110.

Figure 10:
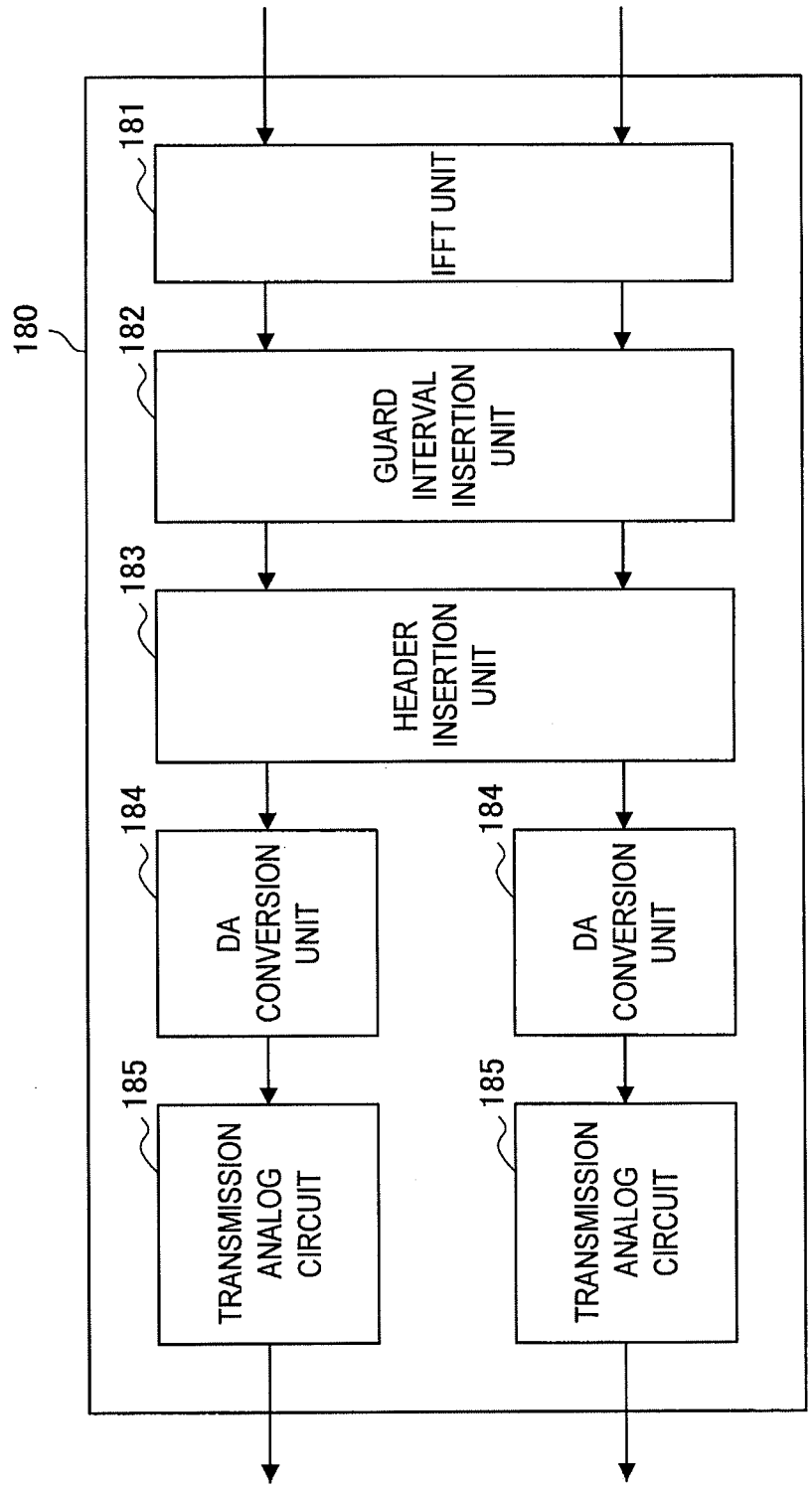
FIG. 10 is a block diagram showing a detail of a radio transmitting unit of the wireless communication device in FIG. 5.

A detailed configuration of the radio transmitting unit 180 is described hereinafter with reference to FIG. 10. FIG. 10 is a block diagram showing a detail of the radio transmitting unit 180 of the wireless communication device 100. The radio transmitting unit 180 mainly includes an IFFT (Inverse Fast Fourier Transform) unit 181, a guard interval insertion unit 182, a header insertion unit 183, a plurality of DA (Digital to Analog) conversion units 184, and a plurality of transmission analog circuits 185.

The IFFT unit 181 converts the transmission signal in the frequency domain which is input from the encoding and modulation unit 170 into a signal in the time domain, and outputs it to the guard interval insertion unit 182.

The guard interval insertion unit 182 inserts a guard interval into the transmission signal which is input from the IFFT unit 181, and outputs it to the header insertion unit 183. At this time, the guard interval is inserted by copying a certain period at the end of the received transmission signal and placing it at the top of the transmission signal, for example.

The header insertion unit 183 inserts a header to the transmission signal which is input from the guard interval insertion unit 182. The header is L-STF, L-LTF, L-SIG, HT-SIG, VHT-SIG, VHT-STF, VHT-LTF or the like, which is shown as an example in FIGS. 3 and 4, for example.

The DA conversion unit 184 converts the transmission signal which is input from the header insertion unit 183 into an analog signal, and outputs it to the transmission analog circuit 185.

The transmission analog circuit 185 performs various signal processing such as signal amplification and frequency conversion on the transmission signal which is input from the DA conversion unit 184, and outputs the transmission signal to the antenna unit 110.

<4. Determination Method Of Packet Format>

The wireless communication device 100 can receive a packet that does not contain the VHT format portion, in addition to the packet that contains the VHT format portion, which is described above. The wireless communication device 100 performs different control in the processing timing of demodulation and decoding depending on whether the format of the received packet contains the VHT format portion or not. Therefore, the wireless communication device 100 determines the type of the received packet in the determination unit 132 as described above.

Figure 11:
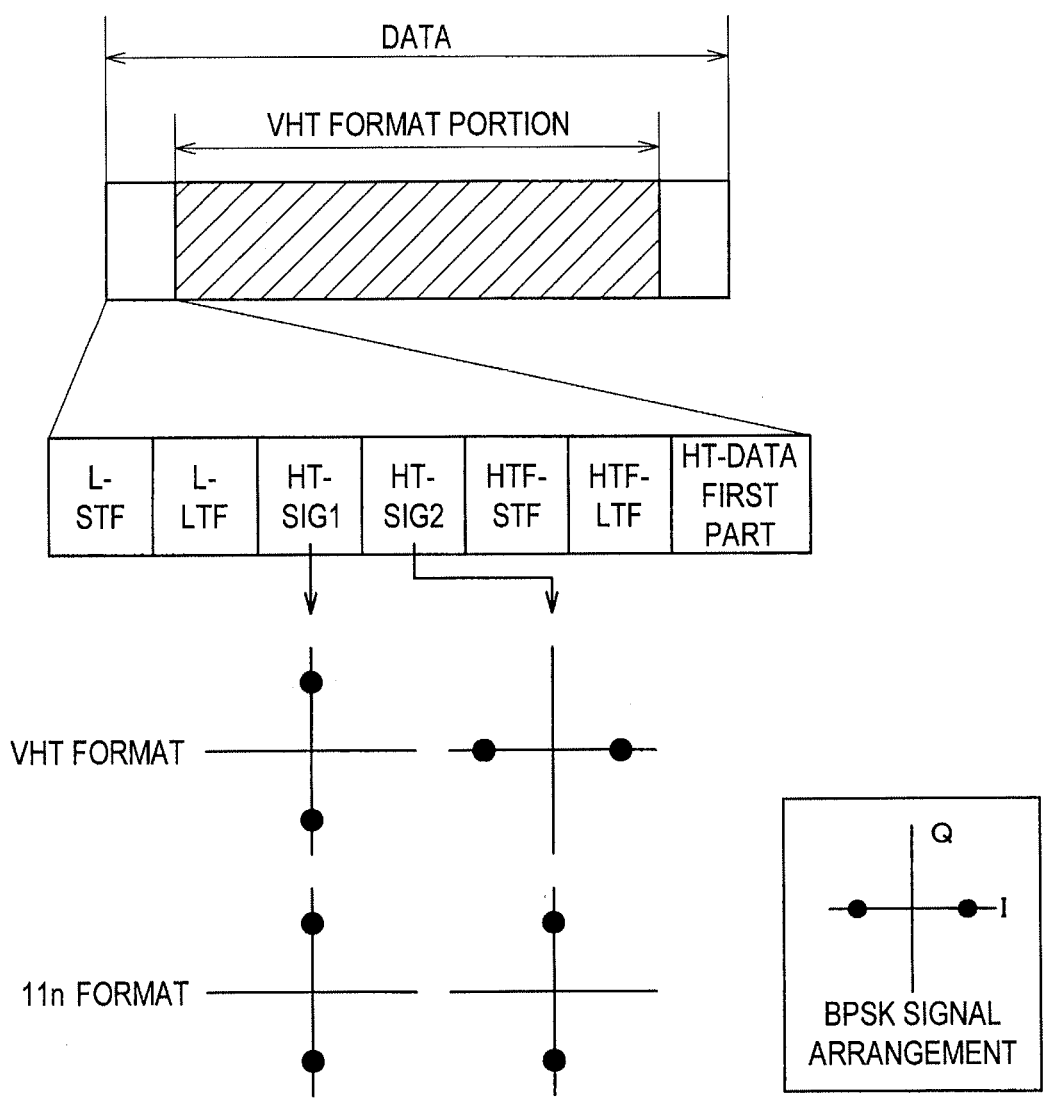
FIG. 11 is an explanatory diagram showing an example of signal arrangement of HT-SIG of a data packet.
Figure 12:
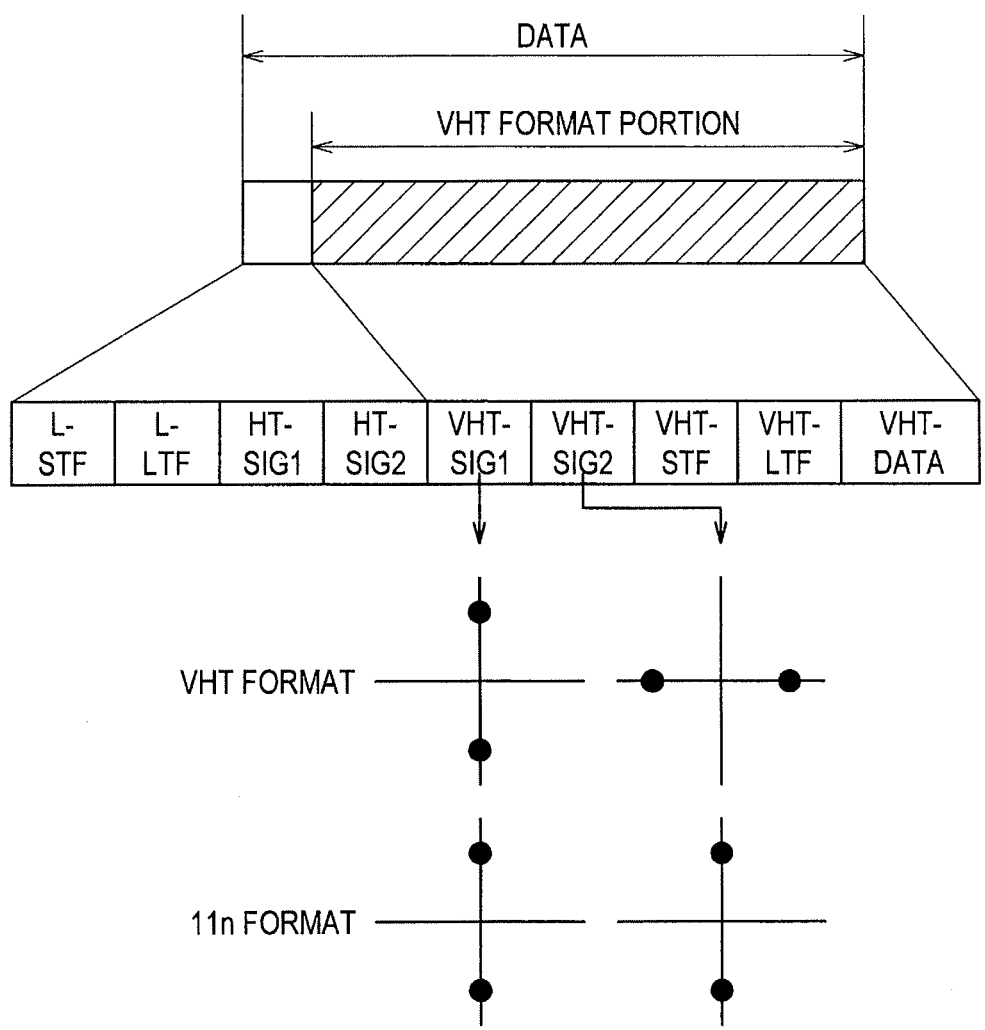
FIG. 12 is an explanatory diagram showing an example of signal arrangement of VHT-SIG of a data packet.

Thus, an example of a method for the determination unit 132 of the wireless communication device 100 to determine the type of the packet based on the signal arrangement of the header is described with reference to FIGS. 11 and 12. FIG. 11 is an explanatory diagram showing an example of signal arrangement of HT-SIG FIG. 12 is an explanatory diagram showing an example of signal arrangement of a position corresponding to VHT-SIG The determination unit 132 can determine the type of the packet based on the signal arrangement in the IQ space of a given position of the header of the received signal, for example. The determination unit 132 may determine the type of the packet based on the signal arrangement in the IQ space of the header of the 11n format portion, or may determine the type of the packet based on the signal arrangement in the IQ space of the position corresponding to the header of the VHT format portion.

First, an example in which the determination unit 132 determines the type of the packet based on the signal arrangement in the IQ space of the header of the 11n format portion, e.g., the signal arrangement of HT-SIG, is described with reference to FIG. 11. For example, in the case of 11a and 11n, the number of symbols of HT-SIG in the data packet is 2 OFDM symbols. Thus, hereinafter, the first symbol is referred to as HT-SIG1, and the second symbol is referred to as HT-SIG2.

The signal arrangement of HT-SIG1 and HT-SIG2 of 11a is both the signal arrangement of BPSK. Further, the signal arrangement of HT-SIG1 and HT-SIG2 of 11n is both the 90-degree rotation of the signal arrangement of BPSK. Thus, for a packet having the format containing the VHT format portion, the signal arrangement of HT-SIG1 is the 90-degree rotation of the signal arrangement of BPSK, and the signal arrangement of HT-SIG2 is the signal arrangement of BPSK, for example. The determination unit 132 can determine the type of the packet based on such signal arrangement.

According to the above-described example, when the signal arrangement of HT-SIG1 is the 90-degree rotation of the signal arrangement of BPSK, the determination unit 132 can determine that the received packet is a packet having the format conforming to 11n or a packet having the format containing the VHT format portion. Further, when the signal arrangement of HT-SIG2 is the signal arrangement of BPSK, the determination unit 132 can determine that the received packet is a packet having the format containing the VHT format portion.

Next, an example in which the determination unit 132 determines the type of the packet based on the signal arrangement in the IQ space of the position corresponding to the header of the VHT format portion, e.g. the signal arrangement of the position corresponding to VHT-SIG, in the received packet is described with reference to FIG. 12. The number of symbols of VHT-SIG is 2 OFDM symbols. Thus, hereinafter, the first symbol is referred to as VHT-SIG1, and the second symbol is referred to as VHT-SIG2.

For a packet having the format conforming to 11a, generally, the signal arrangement of the positions corresponding to VHT-SIG1 and VHT-SIG2 when the format is the VHT format is both the signal arrangement of BPSK. Further, for a packet having the format conforming to 11n, the signal arrangement of the positions corresponding to VHT-SIG1 and VHT-SIG2 is both the 90-degree rotation of the signal arrangement of BPSK. Thus, for a packet having the format containing the VHT format portion, the signal arrangement of VHT-SIG1 is the 90-degree rotation of the signal arrangement of BPSK, and the signal arrangement of VHT-SIG2 is the signal arrangement of BPSK, for example. The determination unit 132 can determine the type of the packet based on such signal arrangement.

According to the above-described example, when the signal arrangement of the position corresponding to VHT-SIG1 in the received packet is the 90-degree rotation of the signal arrangement of BPSK, the determination unit 132 can determine that the received packet is a packet having the format conforming to 11n or a packet having the format containing the VHT format portion. Further, when the signal arrangement of the position corresponding to VHT-SIG2 is the signal arrangement of BPSK, the determination unit 132 can determine that the received packet is a packet having the format containing the VHT format portion.

The data packet shown in FIG. 12 has the VHT format as a whole, not a part of the data portion. The data packet is the same as the 11n format until HT-SIG. Further, the VHT format comes immediately after HT-SIG. Thus, variable length data such as HT-DATA, for example, does not exist between the header of the existing 11n format portion and the VHT format portion. Therefore, in the case of using a packet having such a format as the data packet containing the VHT format portion, the determination unit 132 can determine the type of the packet based on the signal arrangement of the position corresponding to the header of the VHT format portion.

In the case of determining the type of the packet based on a difference in the signal arrangement of the position corresponding to the header of the VHT format portion as described above, because the format is the same as the existing 11n from L-STF to HT-SIG2, there is an advantage that the hardware configuration can be easily constructed.

Note that the signal arrangement used for determining the type of the packet is not limited to the above-described example as long as it is different for each type of a packet so that the type of the packet can be determined.

Further, the determination unit 132 may determine the type of the received packet based on the signal arrangement of HT-SIG and further determine the type of the received packet based on the signal arrangement of the position corresponding to VHT-SIG. By performing two stages of determination in this manner, the determination unit 132 can determine the type of the packet more accurately.

<5. Alternative Examples>

Various alternative examples of the wireless communication device 100 according to one embodiment of the present invention which is described in the foregoing are described hereinbelow.

[5-1. Alternative Example 1 (Alternative Example of Subcarrier Interval)]

Figure 13:
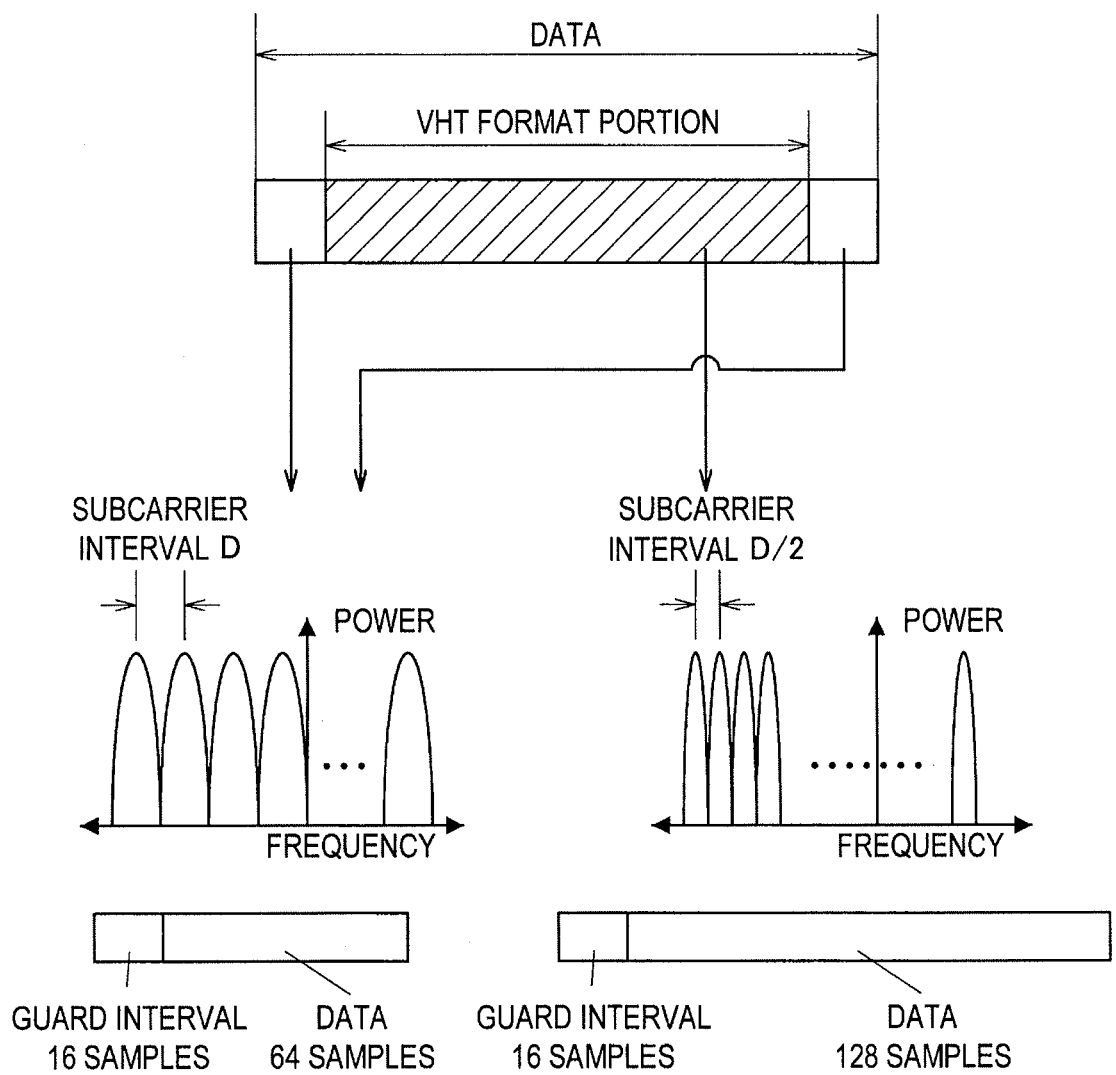
FIG. 13 is an explanatory diagram showing an alternative example in which a subcarrier interval is changed.

First, an alternative example in which throughput is improved by setting the subcarrier interval of the VHT format portion to be narrower than that of the 11n format portion is described with reference to FIG. 13. FIG. 13 is an explanatory diagram showing an alternative example in which the subcarrier interval is changed. Note that the reference numerals of the functional units described hereinbelow correspond to the reference numerals in the functional block diagrams shown in FIGS. 5 to 10.

Generally, an error occurs between the carrier frequency of the transmitting device and the carrier frequency of the receiving device. When the error exists, the center frequencies of the subcarriers which are input to the FFT in the receiving device are uniformly shifted, and the characteristics of the received signal are significantly degraded.

In order to correct the error, the frequency offset compensation unit 124 estimates a frequency offset from the phase rotation amount of the repetitive signal period of the received signal. Then, the frequency offset compensation unit 124 corrects the received signal by using the estimated frequency offset.

However, the frequency offset compensation unit 124 is unable to prevent the occurrence of a control error due to the effect of thermal noise or the like. Therefore, an error called a residual carrier frequency offset occurs.

The phase rotation correction unit 152 corrects the residual carrier frequency offset by using a known signal called pilot subcarrier which is extracted from the subcarrier signal after channel equalization.

In this manner, by the functions of the frequency offset compensation unit 124 and the phase rotation correction unit 152, the wireless communication device 100 achieves highly accurate offset compensation. For example, in the case of performing the frequency offset compensation on the VHT format portion of the packet having the data area of the 11n format portion ahead of the VHT format portion like the data packets shown in FIGS. 3 and 4, for example, the frequency offset compensation unit 124 can perform the frequency offset compensation on the VHT format portion by using the 11n format portion. The frequency offset compensation unit 124 can thereby perform the offset compensation on the VHT format portion with high accuracy.

When highly accurate offset compensation can be made on the VHT format portion, the interleaving unit 174 can perform multiplexing of more subcarriers in the VHT format portion than in the 11n format portion, for example. Specifically, by setting the narrower subcarrier interval, a larger number of subcarriers can be multiplexed than before. For example, as shown in FIG. 13, the subcarrier interval of the VHT format portion can be set to one half (D/2) of the subcarrier interval D of the 11n format portion.

By setting the narrower subcarrier interval, the time occupied by 1 OFDM symbol can be elongated. Elongating the time occupied by 1 OFDM symbol has an effect of reducing the proportion of the guard interval with respect to the data area. The reduction of the proportion of the guard interval leads to the improvement of throughput.

[5-2. Alternative Example 2 (Alternative Example of Determination Control Unit)]

Next, a determination control unit 230, which is an alternative example of the determination control unit 130, is described with reference to FIG. 14. The determination control unit 230 performs control that determines the type of the packet that is contained in the received signal which is input from the radio receiving unit 120 and sorts it into data to be output to the channel equalization unit 140 and data to be processed by an arithmetic unit 239, for example.

Figure 14:
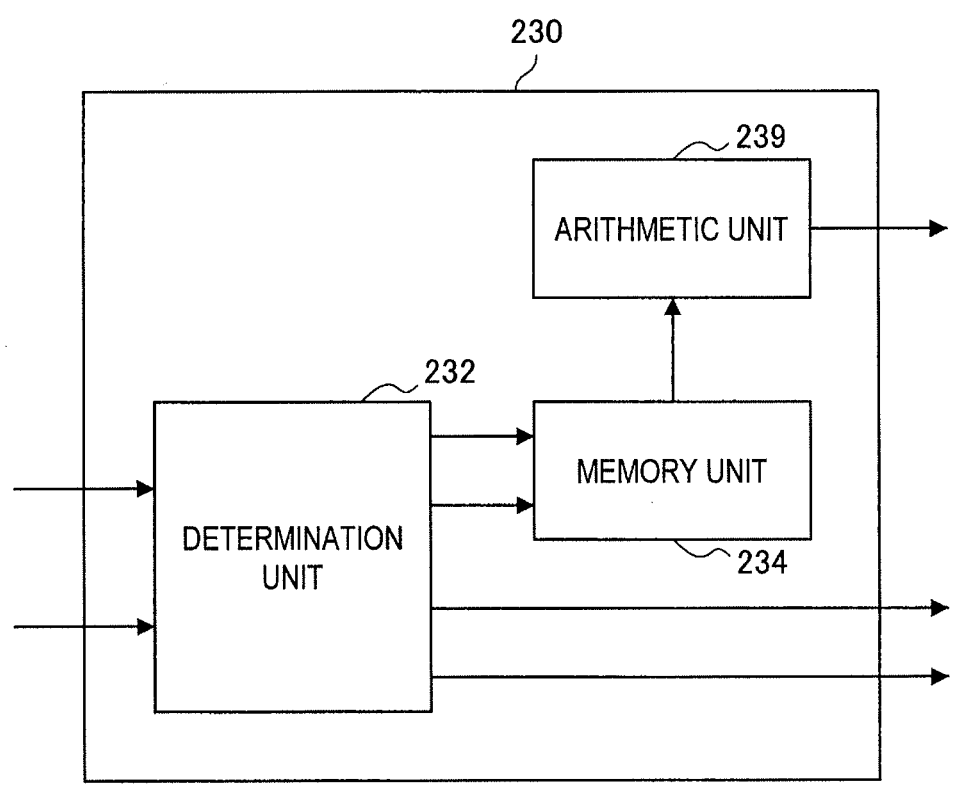
FIG. 14 is a block diagram showing an alternative example of the determination control unit in FIG. 7.

FIG. 14 is a block diagram showing a detail of the determination control unit 230 of the wireless communication device 100. The determination control unit 230 mainly includes a determination unit 232, a memory unit 234, and an arithmetic unit 239.

The determination unit 232 determines the type of the packet which is input from the radio receiving unit 120. Then, as a result of the determination, when the format of the packet contains the VHT format portion, the determination unit 232 outputs the VHT format portion to the memory unit 234. Further, the determination unit 232 outputs the 11n format portion to the channel equalization unit 140. Further, when the format of the packet does not contain the VHT format portion, the determination unit 232 outputs the packet to the channel equalization unit 140.

The memory unit 234 temporarily stores the VHT format portion which is input from the determination unit 232. The memory unit 234 outputs the stored VHT format portion to the arithmetic unit 239.

The arithmetic unit 239 executes arithmetic operation for demodulation and decoding, for example, on the received signal which is input from the memory unit 234 by software, and outputs the received signal after the execution to the processing unit 160. The arithmetic unit 239 is an arithmetic logic device such as a CPU, for example. The arithmetic unit 239 reads a program from a storage medium storing the program describing the procedure of arithmetic processing such as demodulation and decoding, for example, for the data of the input VHT format portion, and interprets and executes the program.

The 11n format portion is output to the channel equalization unit 140, processed by the demodulation and decoding unit 150, and then output to the processing unit 160. After completing the demodulation and decoding of the 11n format portion, the processing unit 160 outputs ACK, which is a response signal, to the encoding and modulation unit 170. Thus, for the VHT format portion, a sufficient processing time is allowed for a series of processing including space division, such as demodulation and decoding. The wireless communication device 100 can thereby have a configuration to perform arithmetic processing by a CPU which requires a longer processing time than arithmetic operation using a circuit.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

The invention claimed is:

1. An electronic device that is capable of receiving data conforming to IEEE 802.11a, IEEE 802.11n and a very high throughput data (VHT-Data), comprising processing circuitry configured to:
    receive an IEEE 802.11a signal, a first very high throughput signal (VHT-SIG) and a second very high throughput signal (VHT-SIG), wherein the first VHT-SIG, the second VHT-SIG and the IEEE 802.11a signal are received in a single data packet;
    demodulate the IEEE 802.11a signal according to a first signal point location that defines a first arrangement of signal points in a signal space, wherein the IEEE 802.11a signal is modulated by a binary phase shift keying (BPSK) scheme;
    demodulate the first VHT-SIG according to a second signal point location that defines a second arrangement of signal points in the signal space, wherein the second signal point location is rotated by 90 degrees relative to the first signal point location;
    demodulate the second VHT-SIG according to the first signal point location; and
    demodulate a very high throughput data (VHT DATA), wherein the second VHT-SIG is in a field between a field of the first VHT-SIG and a field of the VHT Data,
    wherein the circuitry includes a processor which processes a software stored in a memory.

2. The electronic device according to claim 1, wherein the circuitry is further configured to receive legacy short training field (L-STF), legacy long training field (L-LTF), very high throughput short training field (VHT-STF) and very high throughput long training field (VHT-LTF) in the single data packet.

3. The electronic device according to claim 2, further comprising an antenna for receiving the VHT Data.

4. An electronic device for communicating with a first station that is capable of decoding a data conforming to IEEE 802.11a, a second station that is capable of decoding a data conforming to an IEEE 802.11n and a third station that is capable of decoding a very high throughput data (VHT-Data), comprising processing circuitry configured to:
    obtain an IEEE 802.11a signal, a first very high throughput signal (VHT-SIG) and a second very high throughput signal (VHT-SIG), wherein the first VHT-SIG, the second VHT-SIG and the IEEE 802.11a signal being transmitted in a single data packet;
    modulate the IEEE 802.11a signal according to a first signal point location that defines a first arrangement of signal points in a signal space, wherein the IEEE 802.11a signal is modulated by a binary phase shift keying (BPSK) scheme;
    modulate the first VHT-SIG according to a second signal point location that defines a second arrangement of signal points in the signal space, the second signal point location is rotated by 90 degrees relative to the first signal point location;
    modulate the second VHT-SIG according to the first signal point location; and
    modulate a very high throughput data (VHT DATA), wherein the second VHT-SIG is in a field between a field of the first VHT-SIG and a field of the VHT Data,
    wherein the circuitry includes a processor which processes a software stored in a memory.

5. The electronic device according to claim 4, wherein the circuitry is further configured to transmit legacy short training field (L-STF), legacy long training field (L-LTF), very high throughput short training field (VHT-STF) and very high throughput long training field (VHT-LTF) in the single data packet.

6. The electronic device according to claim 5, further comprising an antenna for transmitting the VHT Data.

* * * * *